No. 642,774. Patented Feb. 6, 1900.
J. C. ANDERSON.
PNEUMATIC TIRE.
(Application filed July 21, 1899.)
(No Model.)
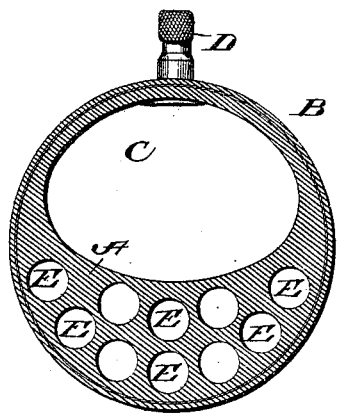
Fig. 1.
Fig. 2.
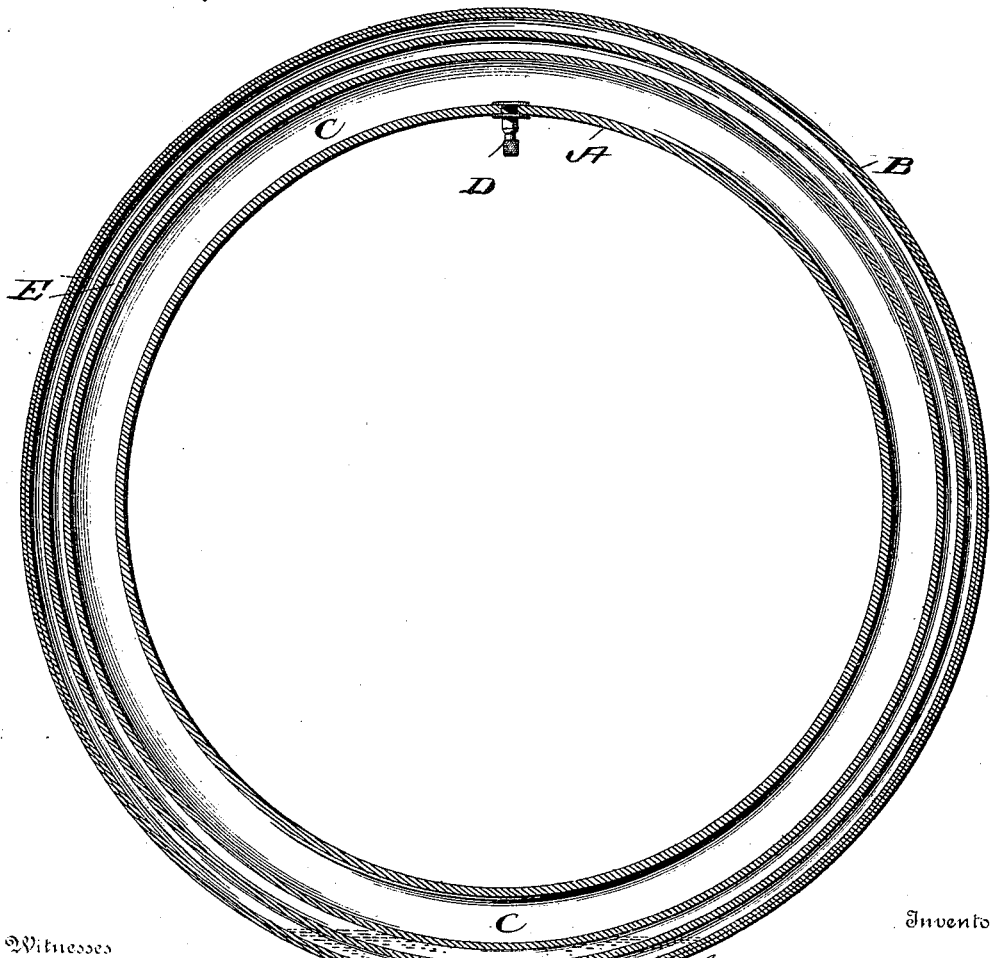
Witnesses
Inventor
Jas. C. Anderson
By _____ Attorney
THE NORRIS PETERS CO., PHOTO-LITHO., WASHINGTON, D. C.

UNITED STATES PATENT OFFICE.

JAMES C. ANDERSON, OF HIGHLAND PARK, ILLINOIS.

PNEUMATIC TIRE.

SPECIFICATION forming part of Letters Patent No. 642,774, dated February 6, 1900.

Application filed July 21, 1899. Serial No. 724,681. (No model.)

*To all whom it may concern:*

Be it known that I, JAMES C. ANDERSON, a citizen of the United States, residing at Highland Park, in the county of Lake and State of Illinois, have invented certain new and useful Improvements in Pneumatic Tires; and I do hereby declare the following to be a full, clear, and exact description of the invention, such as will enable others skilled in the art to which it appertains to make and use the same.

My invention relates to certain new and useful improvements in tires especially designed for use on autotrucks and automobiles and also available for bicycles and other vehicles.

My invention has for its object to provide a tire which, while it is not non-puncturable in the ordinary sense, shall be so constructed that a puncture will not destroy its efficiency or pneumatic characteristics.

Pneumatic tires, as well as cushion-tires, have long been known and used. In the former class many suggestions have been made with reference to protecting them against puncture and treating the punctures when made automatically. It has also been suggested to construct pneumatic tires with certain kinds of fillers designed to support the weight of a rider after the tire has been punctured and the air has escaped. My invention differs from all these described constructions and from all others with which I am familiar; and it consists of a tire having a main air-space provided with an air-valve through which the main air-space may be inflated or deflated and a series of supplemental air-spaces between the main air-space and the outer surface of the tire, the said supplemental air-spaces being separated from each other and from the main air-space and exterior surface by the composition or material of which the tire is formed, said supplemental air spaces or cells being filled with highly-expanded air or equivalent which has been previously compressed, the inclosed and expanded (previously compressed) air or equivalent exerting sufficient power to hold the air-cells against collapse under the action of weight or pressure attendant upon the ordinary use of a tire.

In order that those skilled in the art to which my invention appertains may fully understand the same, I will proceed to describe the same in detail, referring by letters to the accompanying drawings, in which—

Figure 1 is a central or disk section of a tire embodying my invention, and Fig. 2 a transverse or cross section of the same.

Similar letters of reference denote like parts in both figures of the drawings.

A represents what I denominate the "body" of the tire and is composed of rubber, with the ordinary outer protecting or wearing surface B, of any suitable material. The body of the tire is formed with an inflatable air-space C and provided with an ordinary air-valve D.

Exteriorly to the air-space C, I form a series of circumferential air-cells E, which, as shown, are separated from each other and also from the main air-space C and the outer surface of the tire by the material composing the body A. The number, size, and location of the supplemental air-cells E may be varied, so long as their general purpose is not defeated. The main air-space C should be of such proportion and capacity that when deflated the tire may be readily removed from the rim of the wheel and when inflated shall expand the tire to suitable proportions and contour in cross-section.

In the course of construction and before the two ends of the tube constituting the tire are vulcanized together the supplemental air-cells E are charged with a predetermined quantity of liquid air or equivalent, as fully described in an application filed by me concurrently with this and describing and claiming the method employed in manufacturing my improved tire. This charge of liquid air before expansion is represented by the dotted lines shown at the bottom portion of Fig. 2, which air when duly expanded by conditions of temperature after the vulcanization and joining of the ends of the tube constituting the tire completely fills and holds in expanded or distended condition the several air cells or chambers C, and as the latter are absolutely closed the contained air cannot escape and said cells or chambers continue in their proper inflated condition and under pressure sufficient to prevent collapse of the air-cells under the weight and pressure exerted in the practical use of the tire.

When the tire is compressed and placed in position upon the rim of the wheel, an ordinary air-pump is connected with the valve D, and the main air-space C is duly inflated in the same manner that the ordinary pneumatic tire is inflated. This main air-space constitutes a substantial air cushion or backing for that portion of the body of the tire in which are located the supplemental air-cells E, and the latter coöperating with the former give to the tire the necessary strength and resiliency.

From the construction shown and described it will be seen that if a body should puncture the outer surface of the tire it is just as liable to enter the body portion of the tire between the cells E as to puncture one of said cells and that should it puncture one of said cells the remaining cells and the main air-space C will be amply sufficient to sustain any ordinary load imposed upon the vehicle and that the expansion force of the confined air in the remaining cells E will force the composition of the body from all directions toward and into this punctured cell, and thus maintain the original form of the tire. This action will necessarily follow from the character of the confined air and the manner of its introduction into the cells, as fully described in the application hereinbefore referred to. The supplemental air-cells being each and all surrounded by comparatively thick walls or partitions may be highly charged with the liquid air, and consequent high expansion force is secured, which is especially desirable.

In autotrucks and automobiles the pneumatic tire is particularly desirable for the following reasons: As the propelling power is applied directly to the wheels, it becomes necessary to provide such a degree of traction as will prevent the slipping of the wheels upon the roadway, and for this reason solid-rubber tires were suggested and have to a comparatively limited extent been used; but it has been found that the stretching of the tire, due to the traction, causes such tires to creep to such an extent as to render them undesirable, and hence preference has been given to pneumatic tires; but even in this class of tires a harmful degree of creeping exists. With my improved tire a greater degree of strength and solidity is secured, and hence the creeping tendency is greatly reduced and practically entirely overcome, this result being due to the crescent form of the tire outside of the main air-space and the high degree of inflation which is obtained, as well as to the fact that the thick partitions between the supplemental air-cells thoroughly brace the body of the tire, while at the same time they are capable of radial movement to compensate for the accidental deflation of an adjacent air-cell.

I desire to emphasize the fact that my improved tire differs from all other tires in the circumstance that it not only contains a series of supplemental air-cells exterior to the main air-space, but the said supplementary air-cells have an unbroken continuity and are permanently inflated with highly-expanded air or equivalent capable of not only holding the several air-cells in their extended condition, but acting as a resistant to the collapsing of the cells, as hereinbefore explained.

I am aware that tires have been made with an air-space adapted to be inflated with air under such a state of compression as to maintain the tire in proper inflated condition and that such air-space has been protected by an outer body provided with circumferential cells which of necessity contain ordinary atmospheric air and that such cells operate in substantially the manner that the cell or cells of a cushion-tire operate—viz., they permit the solid-rubber portion of the tire to yield more readily than would be the case if the rubber tire were solid throughout. I do not wish to have my invention confounded with any such construction, as the air-cells in my improved tire are filled with a body adapted to resist the pressure exerted against the exterior surface of the tire in the same manner that the air contained within an ordinary pneumatic tire operates.

I am also aware that it has been suggested in the manufacture of single pneumatic tires and during the step of vulcanization to introduce within the tire a body or agent which under the action of heat will expand sufficiently to operate as a mandrel to hold the tire in proper condition within the mold during the vulcanization process; but it will be obvious that this step in no wise involves inflation of the tire to such a degree as to act as a permanent inflatant capable of resisting the exterior pressure exerted in the ordinary use of the tire. In fact, this condition has been recognized, because all such tires so made are provided with air-valves adapted for special use with an air-pump for inflating the tires.

My invention is based upon the recognized properties of the rubber used in the manufacture of tires—viz., it is non-compressible and absolutely impervious to water and air—and consequently if air in a highly-expanded condition is sealed within a rubber envelop or holder it cannot escape, and therefore constitutes a permanent cushion and to the same extent that air pumped into a pneumatic tire does before it begins to leak or escape through the valve.

Having described the construction and advantages of my improved tire, what I claim as new, and desire to secure by Letters Patent, is—

A pneumatic tire having a circumferential inner and main inflatable and deflatable air-chamber, and a series of continuous supplemental non-deflatable air chambers or cells, independent of each other and of the main air-chamber, and located between the main air-chamber and the exterior face of the tire, the supplemental independent air-chambers being permanently inflated and rendered non-collapsing by highly-expanded (previously compressed), air or equivalent, sealed within said chambers, substantially as hereinbefore set forth.

In testimony whereof I affix my signature in presence of two witnesses.

JAMES C. ANDERSON.

Witnesses:
JENNIE G. BOOTH,
N. CURTIS LAMMOND.